(12) United States Patent
Rozado

(10) Patent No.: US 8,126,142 B2
(45) Date of Patent: Feb. 28, 2012

(54) VARIABLE DATA ENCRYPTION OF CHARACTERS PRINTED OR DISPLAYED ON SCREEN, WHICH MAY BE EMBEDDED IN PHOTOS, IMAGES, DRAWINGS, ILLUSTRATIONS, LOGOS OR FIGURES, FOR SECURITY PURPOSES

(75) Inventor: João Robinson Rozado, São Bernardo do Campo (BR)

(73) Assignee: Interprint Ltda., Sao Bernardo Do Campo (BR)

( * ) Notice: Subject to any disclaimer, the term of this patent is extended or adjusted under 35 U.S.C. 154(b) by 911 days.

(21) Appl. No.: 11/842,389

(22) Filed: Aug. 21, 2007

(65) Prior Publication Data
US 2009/0052666 A1    Feb. 26, 2009

(51) Int. Cl.
*G09C 5/00* (2006.01)
(52) U.S. Cl. .......................................... 380/54
(58) Field of Classification Search ....... 380/54
See application file for complete search history.

(56) References Cited

U.S. PATENT DOCUMENTS
2004/0258274 A1 * 12/2004 Brundage et al. ............. 382/100

FOREIGN PATENT DOCUMENTS
BR    0500934    7/2005

* cited by examiner

*Primary Examiner* — Jacob Lipman
(74) *Attorney, Agent, or Firm* — Dennis B. Haszko

(57) ABSTRACT

It is a source of security digital characters, incomprehensible to the naked eye, which can only be identified when the transparent substrate (acrylic, plastic or another material) is placed over the substrate on which they were printed (paper, PVC, polyester, film or others), or over the screen where they are displayed (CRT, LCD, plasma, acrylic or others), and the characters that are unreadable characters may be embedded or may be part of photos, images, drawings, illustrations, logos or figures, and the transparent base contains the remaining and complementary parts of the characters already printed or displayed on the screen, in a manner that their combination with the characters printed or displayed on the screen reveals them or make them comprehensible and identifiable, being that each substrate, described thus, may reveal or make comprehensible a series of documents containing these sources printed or displayed on the screen, or may even reveal and make the characters printed or displayed on the screen comprehensible from a single document containing these sources, in a manner that these characters make up a single-valued and reciprocal match with the transparent substrate, and in the latter case, both the printed characters or characters displayed on the screen, and the transparent substrate are created exclusively for one another.

6 Claims, 2 Drawing Sheets

DET. A

Figure 1:
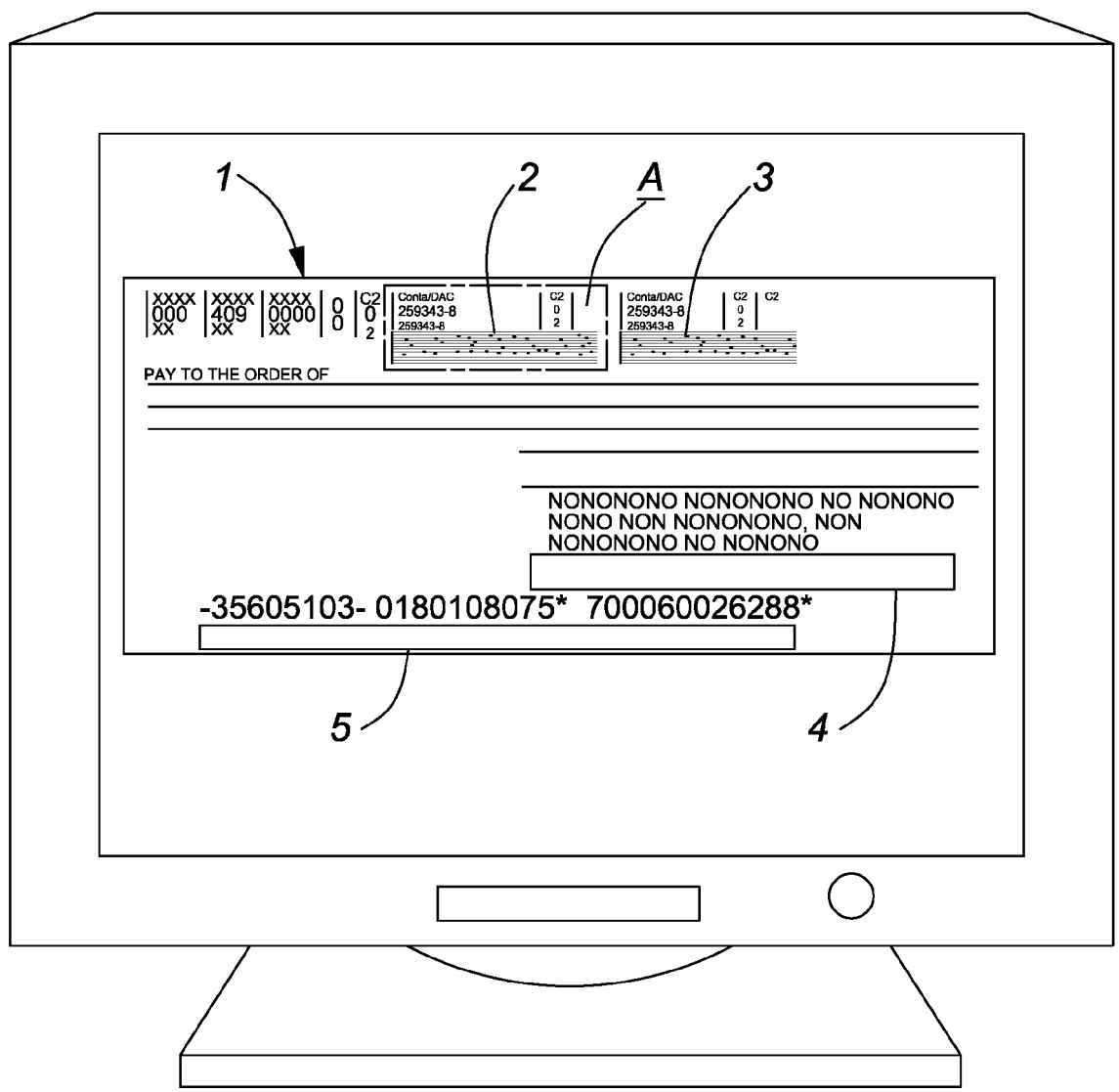

VARIABLE DATA ENCRYPTION OF CHARACTERS PRINTED OR DISPLAYED ON SCREEN, WHICH MAY BE EMBEDDED IN PHOTOS, IMAGES, DRAWINGS, ILLUSTRATIONS, LOGOS OR FIGURES, FOR SECURITY PURPOSES

The present patent of Invention is a Variable Data Encryption of Characters Printed or Displayed on Screen, which May Be Embedded in Photos, Images, Drawings, Illustrations, Logos or Figures, for Security Purposes, which is a very important continuity to the material that is object of the patent application PI 0500934-0, filed on Mar. 11, 2005, adding to the claimed system herein, other advantages to the already presented ones and assuring more security and/or difficulties against cunning acts through frauds, adulterations and bad faith.

PI 0500934-0 is a document data adulteration detection system comprising a variable data encryption embedded in these documents. This encryption follows the variable data that is copied in encrypted form during printing in laser printers (toner deposition), ink jet and other forms of printing with the capacity to vary the printed data.

These encrypted data are applied in small dots placed between a group of lines, and unreadable to the naked eye or even with the aid of a magnifying glass.

These lines make up the base on which these data are encrypted in a very difficult manner to interpret, and this base may be designed by thin lines that may be parallel, undulated, circular, checked, vertical, diagonal or in other layouts.

The reading or deciphering of the ciphered data is only possible through the use of a screen made up of a transparent sheet on whose surface is a set of embedded lines that are identical to that on the base where the data are encrypted. Decryption and deciphering of data is achieved by placing the screen over the ciphered text and aligning the screen lines and the ciphered text lines, making the data visible through the screen in plain-text form.

This decrypted data are then compared with the normal variable data printed in the document to prove the authenticity of the document, or the disclosure of fraud in the event of adulteration.

The present patent of invention is also a source of security digital characters, incomprehensible to the naked eye, which can only be identified when the transparent substrate (acrylic, plastic or another material) is placed over the substrate on which they were printed (paper, PVC, polyester, film or others), or over the screen where they are displayed (CRT, LCD, plasma, acrylic or others) a transparent substrate is added (acrylic, plastic or other material).

Still according to the purpose of this patent, the characters that are incomprehensible to the naked eye may be embedded or may be part of photos, images, drawings, illustrations, logos or figures. The transparent substrate contains the remaining and complementary part of the characters already printed or displayed on the screen, in a manner that their combination with the characters printed or displayed on the screen reveals them or make them comprehensible and identifiable. Each substrate, described thus, may reveal or make comprehensible a series of documents containing these sources printed or displayed on the screen, or may even reveal and make the characters printed or displayed on the screen comprehensible from a single document containing these sources, in a manner that these characters make up a single-valued and reciprocal match with the transparent substrate. In the latter case, both the printed characters and characters displayed on the screen, and the transparent substrate are created exclusively for one another.

Figure 2:
Figure 3:
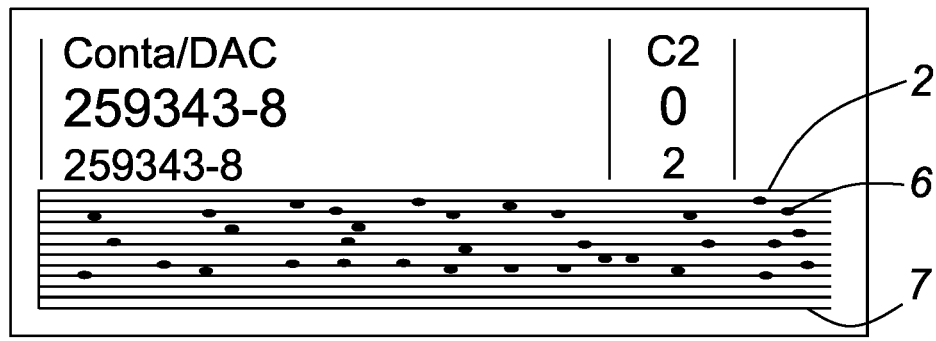
Figure 4:
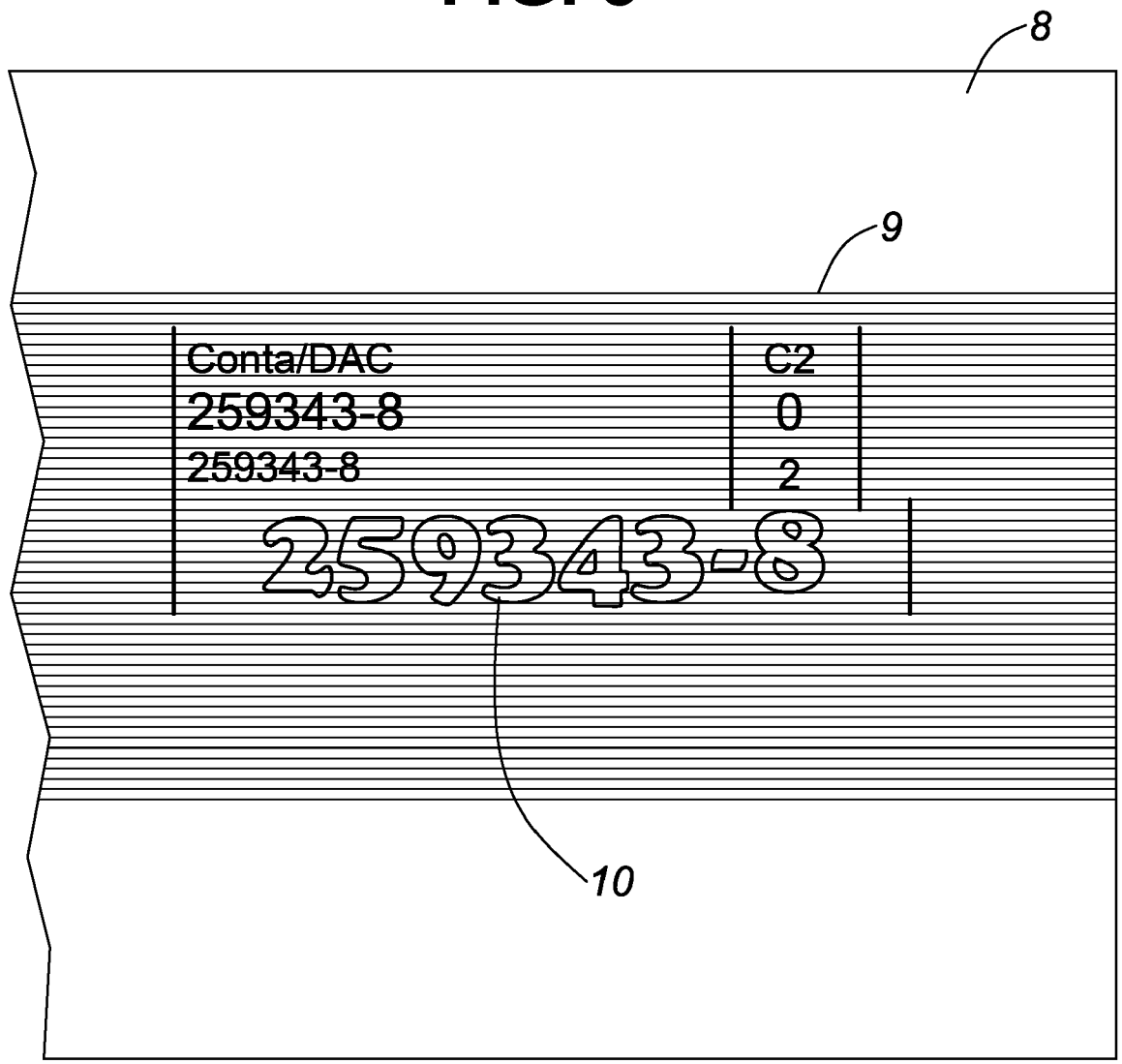

Only demonstrative or illustrative title on which the present patent is based on follows the attached drawings that represent the following:

in FIG. 1, a document (a check) displayed on a screen, on which the reference number 1 represents the check, 2 represents the current account number, 3 represents the check number, 4 represents the name of the issuer, and 5 represents the electronic identification number, and they are copied in encrypted form during printing;

in FIG. 2, the transparent substrate on which the reference number 8 represents the transparent sheet and 9 represents the set of lines identical to those on the base on which the data are encrypted;

in FIG. 3, a detail of the check (detail A) with the current account number normally embedded in legible characters, on which the reference number 2 represents the copy of the current account number in encrypted form, 6 represents the encrypted data applied in small dots and 7 represents the group of lines where the small dots are placed;

in FIG. 4, the transparent substrate used over the screen displaying the document, making the document's variable data encryption visible, and on which the reference number 9 represents the set of the transparent substrate's lines and 10 represents the decrypted data making them visible in plain-text form.

What is claimed is:

1. A method of embedding and retrieving variable data encryption of characters on a document, the method comprising the following steps:
   (a) creating variable data;
   (b) applying an encrypted copy of the variable data in small dots placed between a group of lines on the document, using a printer capable of varying the printed data;
   (c) applying a transparent substrate, having a set of matching lines to the group of lines on the document bearing the encrypted copy of the variable data, the set of lines having the remaining and complementary parts of the encrypted copy of the variable data;
   (d) the combination of the encrypted copy of the variable data on the document and the remaining and complementary parts of the encrypted copy of the variable data on the transparent substrate displaying the variable data encryption of step (b) in a visible plain-text form;
   wherein the transparent substrate is constructed and arranged to be applied in contact with the document bearing the encrypted copy of the variable data or on a screen displaying the document bearing the encrypted copy of the variable data.

2. The method according to claim 1, wherein the encrypted copy of the variable data in the document bearing the encrypted copy is incomprehensible to the naked eye.

3. The method according to claim 1, wherein the encrypted copy of the variable data is embedded in a document selected from the group consisting of: photos, images, drawings, illustrations, logos and figures.

4. The method according to claim 1, wherein the transparent substrate is made of acrylic or plastic.

5. The method according to claim 1, wherein the thin lines are of a configuration selected from the group consisting of: parallel, undulated, circular, checked, vertical and diagonal.

6. The method according to claim 1, wherein the screen is selected from the groups consisting of: CRT, LCD, plasma and acrylic.

* * * * *